(12) United States Patent
Gibson et al.

(10) Patent No.: US 9,764,501 B2
(45) Date of Patent: Sep. 19, 2017

(54) CONTACT LENS MOLD PARTS, CONTACT LENS MOLD ASSEMBLIES, AND METHODS OF MAKING CONTACT LENSES

(71) Applicant: CooperVision International Holding Company, LP, St. Michael (BB)

(72) Inventors: John Robert Gibson, Farnham Common (GB); Geoffrey Douglas Sydney Payne, Bolton (GB)

(73) Assignee: CooperVision International Holding Company, LP, St. Michael (BB)

( * ) Notice: Subject to any disclaimer, the term of this patent is extended or adjusted under 35 U.S.C. 154(b) by 230 days.

(21) Appl. No.: 14/576,229

(22) Filed: Dec. 19, 2014

(65) Prior Publication Data

US 2016/0176072 A1  Jun. 23, 2016

(51) Int. Cl.
| | |
|---|---|
| *B29C 33/38* | (2006.01) |
| *B29C 33/00* | (2006.01) |
| *B29C 33/30* | (2006.01) |
| *B29D 11/00* | (2006.01) |
| *B29L 11/00* | (2006.01) |
| *B29C 33/40* | (2006.01) |
| *B29C 43/58* | (2006.01) |

(52) U.S. Cl.
CPC .......... *B29C 33/38* (2013.01); *B29C 33/0038* (2013.01); *B29C 33/303* (2013.01); *B29D 11/005* (2013.01); *B29D 11/00038* (2013.01); *B29C 33/40* (2013.01); *B29C 2043/5833* (2013.01); *B29L 2011/0041* (2013.01)

(58) Field of Classification Search
CPC .................................................. B29D 11/0048
See application file for complete search history.

(56) References Cited

U.S. PATENT DOCUMENTS

| | | | |
|---|---|---|---|
| 5,160,749 A | 11/1992 | Fogarty | |
| 5,238,388 A | 8/1993 | Tsai | |
| 5,466,147 A | 11/1995 | Appleton et al. | |
| 5,540,410 A | 7/1996 | Lust et al. | |
| 5,540,543 A | 7/1996 | Lust et al. | |

(Continued)

FOREIGN PATENT DOCUMENTS

| | | |
|---|---|---|
| DE | 29723514 U1 | 10/1998 |
| EP | 0339642 A2 | 11/1989 |

(Continued)

OTHER PUBLICATIONS

Search and Examination Report issued in corresponding United Kingdom Patent Application No. 1422769.8 dated Jun. 24, 2015 (6 pages).

*Primary Examiner* — Ryan Ochylski
(74) *Attorney, Agent, or Firm* — Kilyk & Bowersox, P.L.L.C.

(57) ABSTRACT

A contact lens mold part and a contact lens mold assembly (1) are provided. The contact lens mold assembly includes a first mold part (2) and a second mold part (3) assembled together. Each mold part has a lens-forming surface with a circumferential edge, a stop surface extending from the circumferential edge, an intermediate region extending from the stop surface, and an alignment surface extending from the intermediate region. The mold parts can be made to fit together with an interference fit. A method of making a contact lens using the contact lens mold assembly is also provided.

23 Claims, 8 Drawing Sheets

(56) References Cited

U.S. PATENT DOCUMENTS

| | | |
|---|---|---|
| 5,545,366 A | 8/1996 | Lust et al. |
| 5,620,720 A * | 4/1997 | Glick .................. A61F 2/16 |
| | | 249/117 |
| 5,681,138 A | 10/1997 | Lust et al. |
| 5,702,735 A | 12/1997 | Martin et al. |
| 5,716,540 A | 2/1998 | Matiacio et al. |
| 5,776,514 A | 7/1998 | Wu et al. |
| 5,850,107 A | 12/1998 | Kindt-Larsen et al. |
| 5,861,114 A | 1/1999 | Roffman et al. |
| 5,928,682 A | 7/1999 | Janca et al. |
| 5,938,988 A | 8/1999 | Lust et al. |
| 5,975,875 A | 11/1999 | Crowe, Jr. et al. |
| 5,980,184 A | 11/1999 | Lust et al. |
| 5,981,618 A | 11/1999 | Martin et al. |
| 6,007,229 A | 12/1999 | Parnell, Sr. et al. |
| 6,079,940 A | 6/2000 | Lust et al. |
| 6,176,669 B1 | 1/2001 | Lust et al. |
| 6,180,032 B1 | 1/2001 | Parnell, Sr. et al. |
| 6,186,736 B1 | 2/2001 | Lust et al. |
| 6,368,522 B1 | 4/2002 | Ansell et al. |
| 6,405,993 B1 | 6/2002 | Morris |
| 6,444,145 B1 | 9/2002 | Clutterbuck |
| 6,502,009 B1 | 12/2002 | Parnell, Sr. et al. |
| 6,511,617 B1 | 1/2003 | Martin et al. |
| 6,592,356 B1 | 7/2003 | Lust et al. |
| 6,732,993 B2 | 5/2004 | Dean |
| 6,752,581 B1 | 6/2004 | Lust et al. |
| 6,827,325 B2 | 12/2004 | Hofmann et al. |
| 6,830,712 B1 | 12/2004 | Roffman et al. |
| 7,156,638 B2 | 1/2007 | Lust et al. |
| 7,156,641 B2 | 1/2007 | Ansell et al. |
| 7,516,937 B2 | 4/2009 | Hofmann et al. |
| 7,585,167 B2 | 9/2009 | Lawton et al. |
| 7,811,483 B2 | 10/2010 | Witko |
| 7,935,280 B2 | 5/2011 | Lawton et al. |
| 8,038,912 B2 | 10/2011 | Beebe et al. |
| 8,105,070 B2 | 1/2012 | Reynolds et al. |
| 8,221,659 B2 | 7/2012 | Beebe et al. |
| 8,287,269 B2 | 10/2012 | Dubey et al. |
| 2005/0167038 A1 | 8/2005 | Torris et al. |
| 2006/0006558 A1* | 1/2006 | Yamada .............. B29C 33/0038 |
| | | 264/2.2 |
| 2006/0145369 A1 | 7/2006 | Lawton et al. |
| 2006/0145370 A1 | 7/2006 | Lawton et al. |
| 2006/0145372 A1 | 7/2006 | Jones et al. |
| 2007/0052117 A1 | 3/2007 | Arnet et al. |
| 2007/0267765 A1 | 11/2007 | Ansell et al. |
| 2008/0102151 A1 | 5/2008 | Perez et al. |
| 2014/0103552 A1 | 4/2014 | Nakahashi et al. |
| 2014/0224959 A1* | 8/2014 | Barre .................. B29D 11/005 |
| | | 249/160 |

FOREIGN PATENT DOCUMENTS

| | | |
|---|---|---|
| EP | 0882560 A2 | 12/1998 |
| EP | 0888871 A1 | 1/1999 |
| EP | 0919352 A1 | 6/1999 |
| EP | 1561560 A1 | 8/2005 |
| EP | 1752280 A2 | 2/2007 |
| EP | 1752281 A2 | 2/2007 |
| EP | 1545865 B1 | 1/2008 |
| JP | 04361010 A | 12/1992 |
| JP | 08300425 A | 11/1996 |
| WO | 0059713 A1 | 10/2000 |
| WO | 0174574 A2 | 10/2001 |
| WO | 2008039485 A1 | 4/2008 |
| WO | 2008078395 A1 | 7/2008 |

* cited by examiner

CONTACT LENS MOLD PARTS, CONTACT
LENS MOLD ASSEMBLIES, AND METHODS
OF MAKING CONTACT LENSES

FIELD

The present disclosure relates to contact lens mold parts and contact lens mold assemblies and their use in making contact lenses.

BACKGROUND

Contact lenses can be made by cast molding, which involves forming a contact lens in a contact lens shaped cavity between a first mold part and a second mold part of a contact lens mold assembly. See, for example, U.S. Pat. Nos. 5,160,749; 5,466,147; 6,405,993; and 6,732,993.

Typically, a single contact lens mold assembly for molding a single contact lens product includes a female mold section having a concave optical surface defining an anterior surface of a lens to be made, and a male mold section having a convex optical surface defining a posterior surface of the lens to be made. Thus, when the male and female mold sections are assembled together in a contact lens mold assembly, a contact lens-shaped cavity is formed between the concave surface of the female section and the convex surface of the male section.

In the manufacture of contact lenses, it is desirable to continue to develop new manufacturing components, systems, methods, and the like to reduce production time, to reduce production costs, and to increase productivity, among other things.

SUMMARY

As described herein, the present disclosure provides contact lens mold parts, contact lens mold assemblies, and the use thereof in methods of making contact lenses.

The present disclosure provides, according to a first aspect, a contact lens mold assembly comprising a first mold part and a second mold part, wherein the first mold part comprises:
   a first lens-forming surface having a central axis and a circumferential edge;
   a first stop surface extending radially outwardly from the circumferential edge of the first lens-forming surface in a plane perpendicular to the central axis of the first lens-forming surface;
   a first intermediate region extending from the first stop surface; and
   a first alignment surface extending from the first intermediate region in a direction parallel to the central axis of the first lens-forming surface;
wherein the second mold part comprises:
   a second lens-forming surface having a central axis and a circumferential edge;
   a second stop surface extending radially outwardly from the circumferential edge of the second lens-forming surface in a plane perpendicular to the central axis of the second lens-forming surface;
   a second intermediate region extending from the second stop surface; and
   a second alignment surface extending from the second intermediate region in a direction parallel to the central axis of the second lens-forming surface;
   wherein, in the contact lens mold assembly formed from the first mold part and the second mold part, the first stop surface, of the first mold part, is in continuous contact with the second stop surface, of the second mold part, around the circumferential edge of the second lens-forming surface, and wherein the first alignment surface, of the first mold part, is in contact with the second alignment surface, of the second mold part.

As described herein and illustrated in the accompanying drawings, some embodiments of the present contact lens mold assemblies, including those used in the present methods, can be understood to consist essentially of, or to consist of, two mold parts. In other words, these embodiments may be understood to be two-piece contact lens mold assemblies.

The present disclosure provides, according to a second aspect, a method of making a contact lens comprising the steps of:
   providing a first mold part and a second mold part, the first mold part and the second mold part physically engageable to form a contact lens mold assembly;
   wherein the first mold part comprises a first lens-forming surface having a central axis and a circumferential edge; a first stop surface extending radially outwardly from the circumferential edge of the first lens-forming surface in a plane perpendicular to the central axis of the first lens-forming surface; a first intermediate region extending from the first stop surface; and a first alignment surface extending from the first intermediate region in a direction parallel to the central axis of the first lens-forming surface;
   wherein the second mold part comprises a second lens-forming surface having a central axis and a circumferential edge; a second stop surface extending radially outwardly from the circumferential edge of the second lens-forming surface in a plane perpendicular to the central axis of the second lens-forming surface; a second intermediate region extending from the second stop surface; and a second alignment surface extending from the second intermediate region in a direction parallel to the central axis of the second lens-forming surface; and
   wherein, in the contact lens mold assembly, the first stop surface, of the first mold part, is in continuous contact with the second stop surface, of the second mold part, around the circumferential edge of the second lens-forming surface, and the first alignment surface, of the first mold part, is in contact with the second alignment surface, of the second mold part;
   applying a contact lens precursor material to the first lens-forming surface, of the first mold part, or to the second lens-forming surface, of the second mold part;
   placing the first mold part and the second mold part together such that the first alignment surface, of the first mold part, is in contact with the second alignment surface, of the second mold part, and such that the first stop surface, of the first mold part, is in continuous contact with the second stop surface, of the second mold part, around the circumferential edge of the second lens-forming surface of the second mold part.
   curing the contact lens precursor material to form an unfinished contact lens;
   separating the contact lens from the first mold part and the second mold part to form a separated contact lens; and
   placing the separated contact lens in a contact lens package.

As already set out in respect of the first aspect of the invention, the skilled person will understand that specific features of embodiments of the invention described herein that are not incompatible with each other can be present in any combination in example embodiments of the invention.

The present disclosure provides, according to a third aspect, an automated system for making a contact lens, wherein the automated system includes a component for forming a contact lens mold assembly according to the first aspect of the disclosure. The automated system can further comprise an injection molding machine, an apparatus for applying the contact lens precursor material, an apparatus for curing or polymerizing the contact lens precursor material, an apparatus for separating the unfinished contact lens, an apparatus for placing the separated contact lens in a contact lens package, or any combination thereof.

The present disclosure provides, according to a fourth aspect, a contact lens mold part comprising:
- a lens-forming surface having a central axis and a circumferential edge;
- a stop surface extending radially outwardly from the circumferential edge of the lens-forming surface in a plane perpendicular to the central axis of the lens-forming surface;
- an intermediate region extending from the stop surface; and
- an alignment surface extending from the intermediate region in a direction parallel to the central axis of the lens-forming surface.

The skilled person will of course be appreciated that features described in relation to one aspect of the present disclosure may be incorporated into other aspects of the present disclosure. For example, the method of the disclosure may incorporate any of the features described with reference to the apparatus of the disclosure, and vice versa.

BRIEF DESCRIPTION OF THE DRAWINGS

Embodiments of the present disclosure will now be described by way of example only with reference to the accompanying schematic drawings.

DETAILED DESCRIPTION

Figure 1:
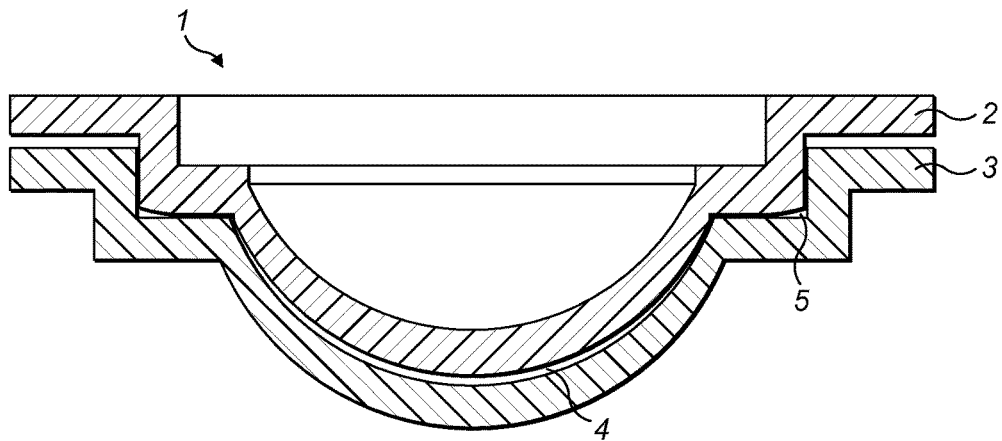
FIG. 1 is a cross-sectional view of a contact lens mold assembly comprising a first mold part and a second mold part according to a first embodiment of the disclosure.

The present disclosure provides, according to a first aspect, a contact lens mold assembly comprising a first mold part and a second mold part, wherein the first mold part comprises:
- a first lens-forming surface having a central axis and a circumferential edge;
- a first stop surface extending radially outwardly from the circumferential edge of the first lens-forming surface in a plane perpendicular to the central axis of the first lens-forming surface;
- a first intermediate region extending from the first stop surface; and
- a first alignment surface extending from the first intermediate region in a direction parallel to the central axis of the first lens-forming surface;

wherein the second mold part comprises:
- a second lens-forming surface having a central axis and a circumferential edge;
- a second stop surface extending radially outwardly from the circumferential edge of the second lens-forming surface in a plane perpendicular to the central axis of the second lens-forming surface;
- a second intermediate region extending from the second stop surface; and
- a second alignment surface extending from the second intermediate region in a direction parallel to the central axis of the second lens-forming surface;

wherein, in the contact lens mold assembly formed from the first mold part and the second mold part, the first stop surface, of the first mold part, is in continuous contact with the second stop surface, of the second mold part, around the circumferential edge of the second lens-forming surface, and wherein the first alignment surface, of the first mold part, is in contact with the second alignment surface, of the second mold part.

As described herein and illustrated in the accompanying drawings, some embodiments of the present contact lens mold assemblies, including those used in the present methods, can be understood to consist essentially of, or to consist of, two mold parts. In other words, these embodiments may be understood to be two-piece contact lens mold assemblies.

The skilled person will understand that specific features of embodiments of the invention described herein that are not incompatible with each other can be present in in any combination in example embodiments of the invention.

Thus, for example, the contact lens mold assembly can be any contact lens mold assembly embodying the invention, wherein the first stop surface of the first mold part extends outwardly relative to the central axis of the first lens-forming surface by about 0.2 mm from the circumferential edge of the first lens-forming surface, and wherein the second stop surface of the second mold part extends outwardly relative to the central axis of the second lens-forming surface by about 0.2 mm from the circumferential edge of the second lens-forming surface.

The contact lens mold assembly can be any contact lens mold assembly embodying the invention, wherein the first alignment surface of the first mold part extends about 0.8 mm from the first intermediate region in a direction parallel to the central axis of the first lens-forming surface, and wherein the second alignment surface of the second mold part extends about 0.8 mm from the second intermediate region in a direction parallel to the central axis of the second lens-forming surface.

The contact lens mold assembly can be any contact lens mold assembly embodying the invention, wherein the first mold part and the second mold part are configured to fit together with an interference fit provided by a physical engagement of the first alignment surface and the second alignment surface such that one mold part grips the other mold part.

The contact lens mold assembly can be any contact lens mold assembly embodying the invention, wherein the contact between the first alignment surface of the first mold part and the second alignment surface of the second mold part is discontinuous in a direction parallel to the circumferential edge of the second lens-forming surface of the second mold part. It can be appreciated that a discontinuous contact surface is formed when the contact between the first and second alignment surfaces has one or more gaps or spaces without contact around the circumference of the alignment surfaces.

For example, the contact lens mold assembly can be any contact lens mold assembly embodying the invention, wherein the second alignment surface of the second mold part comprises one or more raised regions and one or more recessed regions.

The contact lens mold assembly can be any contact lens mold assembly embodying the invention, wherein at least one of the first intermediate region of the first mold part and the second intermediate region of the second mold part is configured to provide an annular cavity between the first mold part and the second mold part.

The contact lens mold assembly can be any contact lens mold assembly embodying the invention, wherein the first intermediate region of the first mold part comprises a curved surface extending from the first stop surface towards the first alignment surface.

The contact lens mold assembly can be any contact lens mold assembly embodying the invention, wherein the second intermediate region of the second mold part comprises an annular recessed section extending parallel to the circumferential edge of the second lens-forming surface.

The contact lens mold assembly can be any contact lens mold assembly embodying the invention, wherein the annular recessed section of the second intermediate region of the second mold part comprises an annular ridge extending parallel to the circumferential edge of the second lens-forming surface, and wherein the annular ridge comprises a planar surface extending in the plane of the second stop surface.

The contact lens mold assembly can be any contact lens mold assembly embodying the invention, wherein the annular recessed section of the second intermediate region of the second mold part comprises a plurality of projections distributed evenly in a direction parallel to the circumferential edge of the second lens-forming surface, and wherein each projection comprises a planar surface extending in the plane of the second stop surface.

The skilled person will understand that the features disclosed in the following paragraphs can be combined in any combination in example embodiments of the invention, and can be combined in any combination with the features disclosed above.

The mold parts can be injection molded mold parts. The injection molded mold parts can be made from a plastic material, for example a thermoplastic material. The injection molded mold parts can be made from a polyolefin material, such as a material comprising, consisting essentially of, or consisting of polypropylene. The injection molded mold parts can be made from a polar thermoplastic material, such as a material comprising, consisting essentially of, or consisting of a copolymer of vinyl alcohol, such as an ethylene-vinyl alcohol copolymer, and the like.

The first lens-forming surface and the second lens-forming surface are configured to define a lens-shaped cavity between the first mold part and the second mold part when the mold parts are placed together to form the contact lens mold assembly. The first lens-forming surface can be a convex lens-forming surface and the second lens-forming surface can be a concave lens-forming surface. Alternatively, the first lens-forming surface can be a concave lens-forming surface and the second lens-forming surface can be a convex lens-forming surface. As illustrated in the accompanying drawings and described herein, the second lens-forming surface of the second mold part is a concave lens-forming surface.

As used herein, the central axis of a lens-forming surface is the axis that extends through and normal to the apex of the lens-forming surface. It can also be referred to as the geometric axis of the lens. For a circularly symmetric lens-shaped cavity, it is the axis of rotational symmetry of the cavity. When the first mold part and the second mold part are placed together to define a lens-shaped cavity, the lens shaped cavity can have a central axis which is the now-aligned central axes of the first and second lens-forming surfaces of the first and second mold parts.

As used herein, the longitudinal alignment of the mold parts means the relative positions of the mold parts along the central axis of the lens-shaped cavity. As used herein, the lateral alignment of the mold parts means the relative positions of the mold parts in a direction transverse to the axes of symmetry of the lens-forming surfaces.

The first alignment surface on the first mold part can be configured to cooperate with the second alignment surface on the second mold part, thereby controlling the lateral alignment of the mold parts as the mold parts are placed together. Using a first mold part and a second mold part configured to cooperate in this way, when the first alignment surface is placed in contact with the second alignment surface, the first mold part and the second mold part are placed in correct lateral alignment with each other. The first stop surface of the first mold part can be configured to cooperate with the second stop surface of the second mold part, thereby controlling the longitudinal alignment of the mold parts as the mold parts are placed together. Using a first mold part and a second mold part configured to cooperate in this way, when the first stop surface is placed in continuous contact with the second stop surface of the second mold part around the circumferential edge of the second lens-forming surface of the second mold part, the first mold part and the second mold part are placed in correct longitudinal alignment with each other It has been found that separating the alignment surface from the stop surface on each mold part improves control of the alignment of the mold parts as they are placed together, and reduces the likelihood of the mold parts jamming in an incorrect alignment. For example, because the alignment surfaces extend in a direction parallel to the axes of symmetry of the lens-forming surfaces, contact between those surfaces does not prevent movement of the mold parts along the axes of symmetry. Thus, when the first mold part and the second mold part are placed together, contact between the first alignment surface of the first mold part and the second alignment surface of the second mold part ensures the correct lateral alignment of the mold parts.

Preferably, the first alignment surface of the first mold part slides along the second alignment surface of the second mold part until the first stop surface of the first mold part is brought into contact with the second stop surface of the second mold part. Thus, contact between the first stop surface of the first mold part and the second stop surface of the second mold part ensures the correct longitudinal alignment of the mold parts.

The lens-shaped cavity can have a circumferential edge that is at least partially defined by a contact region between the first stop surface of the first mold part and the second stop surface of the second mold part, the contact region extending continuously around the circumferential edge of the lens-forming surface of the second mold part. The circumferential edge of the lens-shaped cavity forms the lens edge of the contact lens formed within the lens-shaped cavity. The edge of the resulting lens can include a rounded surface portion, such as a rounded posterior surface portion, or it can include one or more planar portions that form a chisel-like edge surface, when viewed in cross-section.

It has been found that locating stop surfaces on the mold parts around the circumferential edge of the lens-shaped cavity improves the control of the shape and size of the lens-shaped cavity when the mold parts are placed together. It has been found that any deformation of the mold parts as they are placed together is less likely to affect the shape of the lens-shaped cavity when the longitudinal alignment of the mold parts is controlled on the edge of the lens-shaped cavity than when that alignment is controlled at a distant region of the mold parts.

The first stop surface of the first mold part can extend, for example, from about 0.1 mm to about 0.3 mm, or about 0.2 mm, from the circumferential edge of the first lens-forming surface in a plane perpendicular to the central axis of the first lens-forming surface. The second stop surface of the second mold part can extend, for example, from about 0.1 mm to about 0.3 mm, or about 0.2 mm, from the circumferential edge of the second lens-forming surface. The contact region between the first stop surface of the first mold part and the second stop surface of the second mold part can extend, for example, from about 0.1 mm to about 0.3 mm, or about 0.2 mm, from the circumferential edge of the lens-shaped cavity in a plane perpendicular to the central axis of the lens-shaped cavity.

It has been found that a contact region between the first stop surface of the first mold part and the second stop surface of the second mold part extending within the range from about 0.1 mm to about 0.3 mm, or, about 0.2 mm, from the circumferential edge of the lens-shaped cavity can provide good control of the longitudinal alignment of the mold parts while still allowing excess lens precursor material to be easily squeezed out from the lens-shaped cavity. It is believed that a contact region of from about 0.1 mm to about 0.3 mm or of about 0.2 mm can provide a contact region which is of a size sufficient to allow reliable alignment of the stop surfaces, and/or which is sufficiently resilient enough to prevent misalignment of the mold parts. It is also believed that a contact region of from about 0.1 mm to about 0.3 mm or of about 0.2 mm can provide a contact region which is of a size sufficient to make it easy to push excess lens precursor material past the contact region and out of the lens-shaped cavity as the mold parts are placed together. It is also believed that a contact region of from about 0.1 mm to about 0.3 mm or of about 0.2 mm can provide a contact region which is of a size sufficient to reduce flash formation because it is easy to push excess lens-precursor material out of the contact region.

The first alignment surface of the first mold part can extend, for example, from about 0.6 mm to about 1 mm, or from about 0.7 mm to about 0.9 mm, or about 0.8 mm, from the first intermediate region in a plane parallel to the central axis of the first lens-forming surface. The second alignment surface of the second mold part can extend, for example, from about 0.6 mm to about 1 mm, or from about 0.7 mm to about 0.9 mm, or about 0.8 mm, from the second intermediate region in a direction parallel to the central axis of the second lens-forming surface. When the mold parts are placed together, the contact region between the first alignment surface of the first mold part and the second alignment surface of the second mold part can extend, for example, from about 0.6 mm to about 1 mm, or from about 0.7 mm to about 0.9 mm, or about 0.8 mm, in a direction parallel to the central axis of the lens-shaped cavity.

It has been found that a contact region between the first alignment surface of the first mold part and the second alignment surface of the second mold part extending within the range of from about 0.6 mm to about 1 mm, or from about 0.7 mm to about 0.9 mm, for example, about 0.8 mm, in a direction parallel to the central axis of the lens-shaped cavity, can provide good control of the lateral alignment of the mold parts as they are placed together while still minimizing the risk of the mold parts becoming jammed in an incorrect alignment. It is believed that a contact region of from about 0.6 mm to about 1 mm, or from about 0.7 mm to about 0.9 mm, or of about 0.8 mm can provide sufficient guidance for the lateral alignment of the mold parts as they are placed together and before the stop surfaces of the mold parts are brought into continuous contact. It is believed that a contact region of from about 0.6 mm to about 1 mm, or from about 0.7 mm to about 0.9 mm, or of about 0.8 mm can make the mold parts less susceptible to becoming jammed as they are placed together and before the stop surfaces of the mold parts are brought into continuous contact.

The first mold part and the second mold part can be made to fit together with an interference fit provided by a physical engagement of the first alignment surface and the second alignment surface such that one mold part grips the other mold part. Optionally, the second mold part can grip the first mold part. Optionally or additionally, the first mold part can grip the second mold part. Optionally, the first alignment surface of the first mold part can surround the second alignment surface of the second mold part when the mold parts are placed together, and the inner diameter of the first alignment surface can be slightly smaller than the outer diameter of the second alignment surface. Optionally, the first alignment surface of the first mold part can be surrounded by the second alignment surface of the second mold part when the mold parts are placed together, and the outer diameter of the first alignment surface can be slightly larger than the inner diameter of the second alignment surface.

As used herein, the outer/inner diameter of the alignment surfaces of the mold parts are the outer/inner diameters before the parts are placed together to form the contact lens mold assembly.

It has been found that by configuring the mold parts to have an interference fit, the mold parts can be releasably held together without the use of a clamp. The use of an interference fit can allow the assembly and disassembly of the mold parts to be achieved simply by pulling by pulling or pushing the mold parts together and pulling or pushing them apart, respectively.

It has also been found that an interference fit between the first alignment surface of the first mold part and the second alignment surface of the second mold part, wherein the contact region between the alignment surfaces extends within the range of from about 0.6 mm to about 1 mm, for example, from about 0.7 mm to about 0.9 mm, or about 0.8 mm, in a direction parallel to the central axis of the lens-forming surface, can result in a particularly useful contact lens mold assembly. It is believed that a contact region of from about 0.6 mm to about 1 mm, or from about 0.7 mm to about 0.9 mm, or of about 0.8 mm can provide an interference fit that can hold the mold parts together during molding while also allowing straightforward assembly and disassembly of the mold assembly.

It can be understood from the present disclosure that the present first and second contact lens mold parts can be cooperatively engaged to form a lens shaped cavity by an interference fit that is provided at a radially outward distance of more than 0 mm from the circumferential edge of the mold parts used to form the lens edge. Thus, a point contact can be established between the first and second mold parts at the circumferential edge to form the lens edge, and an interference fit can be provided radially away from the circumferential edge.

Contact between the first alignment surface of the first mold part and the second alignment surface of the second mold part can be discontinuous in a direction parallel to the circumferential edge of the second lens-forming surface of the second mold part. For example, it may be that contact between the first alignment surface of the first mold part and the second alignment surface of the second mold part does not provide a hydraulic lock between the first mold part and the second mold part. It has been found that such a discontinuous contact between the alignment surfaces can allow air or other gas and/or excess lens precursor material to escape from the space between the mold parts as they are placed together.

The inner alignment surface of the second mold part can comprise at least one raised region, preferably a plurality of raised regions, and at least one recessed region, preferably a plurality of recessed regions. The at least one raised region, or the plurality of raised regions, of the second alignment surface of the second mold part can be contacted with the first alignment surface of the first mold part when the mold parts are placed together. The at least one recessed region, or the plurality of recessed regions, of the second alignment surface can cooperate with the first alignment surface of the first mold part to define a cavity, or a plurality of cavities, extending in a direction parallel to the central axis of the lens-shaped cavity when the mold parts are placed together.

The second alignment surface of the second mold part comprising a plurality of raised regions and a plurality recessed regions can have a notched, indented, castellated, or crenelated surface. The second alignment surface of the second mold part comprising a plurality of raised regions and a plurality recessed regions can have a castellated surface.

It has been found that, in addition to providing cavities between the alignment surfaces through which air or gas and excess lens precursor material can be expelled from between the mold parts, the plurality of raised regions and the plurality of recessed regions of the second alignment surface can allow for some deformation of the second alignment surface, thereby improving the fit between the first mold part and the second mold part.

It has been found that the interference fit between the mold parts can include a second alignment surface comprising a plurality of raised sections and a plurality of recessed sections. It is believed that, by using the second alignment surface comprising plurality of raised and recessed sections, the gripping mold part can have an alignment surface which is flexible enough to deform around the alignment surface of the gripped mold part.

Furthermore, the deformation of the second alignment surface of the second mold part facilitated by the one or more raised regions and one or more recessed regions of the second alignment surface can allow mold parts having slightly differently shaped alignment surfaces to fit together. For example, the second alignment surface can deform slightly to allow an alignment surface having a circular cross-section to fit an alignment surface having an ellipsoidal cross-section. Thus, by using a second alignment surface comprising a plurality of raised sections and a plurality of recessed sections, variation in the shapes of mold parts can be accommodated.

The first and/or second intermediate surface can be textured to improve retention of flash. Other surfaces to which excess monomer can reach, and hence where flash can be formed, can additionally or alternatively be textured to improve the retention of flash.

The second alignment surface of the second mold part can comprise 10 equally spaced raised regions and 10 equally spaced recessed regions. The raised regions of the second alignment surface of the second mold part can be within the range of from about 0.1 mm to about 0.3 mm, or about 0.2 mm, closer to the central axis of the lens-shaped cavity than are the recessed regions of the second alignment surface.

The separation between the raised regions of the alignment surface and the recessed regions of the alignment surfaces can be within the range from about 0.1 mm to about 0.3 mm, or can be about 0.2 mm. It has been found that a separation within the range of from about 0.1 mm to about 0.3 mm, or about 0.2 mm, can provide a space between the first and second alignment surfaces in the contact lens mold assembly that is large enough to allow excess lens precursor material to be expelled from between the mold sections, but small enough to maintain the integrity of the second alignment surface. It is believed that with a separation within the range of from about 0.1 mm to about 0.3 mm, or of about 0.2 mm, the space between the recessed region of the second alignment surface of the second mold part and the first alignment surface of the first mold part can be sufficient to permit expulsion of excess lens precursor material from between the mold parts.

It is believed that with a separation within the range of from about 0.1 mm to about 0.3 min, or of about 0.2 mm, the second alignment surface of the second mold part can be flexible enough to permit an interference fit with the first alignment surface of the first mold part and/or deformation of the second alignment surface, allowing slightly mismatched alignment surfaces to adequately fit together. It is believed that with a separation within the range of from about 0.1 mm to about 0.3 mm, or about 0.2 mm, the second alignment surface of the second mold part can be sufficiently rigid such that the interference fit can be strong enough to hold the mold parts together, and/or that the lateral alignment of the mold parts can be adequately controlled.

The first intermediate region of the first mold part and/or the second intermediate region of the second mold part can be configured to provide an annular cavity between the first mold part and the second mold part when the mold parts are placed together to form a contact lens mold assembly.

It has been found that an annular cavity separated from the lens-shaped cavity by a continuous contact region between the first stop surface of the first mold part and the second stop surface of the second mold part can provide space to accommodate at least some of the excess lens precursor material displaced from the lens-shaped cavity as the mold parts are placed together.

The annular cavity can be in fluid communication with the cavity/plurality of cavities between the optional recessed region/plurality of recessed regions of the second alignment surface of the second mold part and the first alignment surface of the first mold part when the mold parts are placed together to form a contact lens mold assembly. It has been found that such fluid communication can allow the expulsion of air or gas and/or excess lens precursor material from the annular cavity through the cavity/plurality of cavities between the alignment surfaces as the annular cavity fills with excess lens precursor material that has been squeezed out from between the mold parts as they are placed together to form the contact lens mold assembly.

The intermediate region of one mold part can comprise a surface extending in a direction away from the plane of the stop surface of that mold part. For example, the first intermediate region of the first mold part can comprise a surface that curves away from the plane of the first stop surface. Such a surface can be understood to be a curved surface.

It has been found that when the intermediate region of one mold part comprises a surface extending away from the plane of the stop surface of that mold part, including when it comprises a surface that curves away from the plane of the stop surface, the surface of the intermediate region can encourage the movement of any excess lens precursor material away from the lens-shaped cavity. The curve of the curved surface can be concave or convex.

The intermediate region of one mold part can comprise a surface that extends in the same plane as, and is continuous with, the plane of the stop surface of that mold part. For example, the second intermediate region of the second mold part can comprise a surface that forms a continuous planar surface with the second stop surface, wherein the second stop surface is defined as the part of the continuous surface that is brought into contact with the first stop surface of the first mold part when the mold parts are placed together to form a contact lens mold assembly.

The intermediate region of one mold part can comprise an annular recessed section extending parallel to the circumferential edge of the lens-forming surface of that mold part. The annular recessed section can comprise a planar surface parallel to the stop surface of that mold part and recessed from the stop surface. The planar surface parallel to the stop surface of that mold part can be recessed from the stop surface by a distance within the range of from about 0.1 mm to about 0.3 mm, or by about 0.2 mm. For example, the second intermediate region of the second mold part can be in the form of an annular trough disposed between the second stop surface and the second alignment surface.

The second intermediate region of the second mold part can comprise an annular recessed section having an annular ridge extending parallel to the circumferential edge of the second lens-forming surface. The annular ridge can comprise a surface extending in the plane of the second stop surface. On the other hand, the configuration of the second mold part can equally be described as a second mold part having a second intermediate region comprising a surface extending in the plane of the second stop surface, wherein the surface of the intermediate region comprises a pair of annular grooves extending parallel to the circumferential edge of the second lens-forming surface.

The second intermediate region of the second mold part can comprise an annular recessed section having a plurality of projections, each projection comprising a planar surface extending in the plane of the second stop surface. For example, the plurality of projections can be equally distributed along a line parallel to the circumferential edge of the second lens-forming surface, and, for example, there can be ten such projections. The projections can be in the form of cylinders.

The surface of the annular ridge, or the surfaces of the plurality of projections, extending in the plane of the second stop surface of the second mold part, can be in contact with the first stop surface of the first mold part when the mold parts are placed together to form a contact lens mold assembly. In other words, the planar surface(s) of the ridge/plurality of projections can cooperate with the second stop surface of the second mold section and the first stop surface of the first stop section to control the longitudinal alignment of the mold parts.

It has been found that the combination of the second stop surface and the planar surface(s) of the optional annular ridge/plurality of projections with the recessed section of the intermediate region provides good control of the longitudinal alignment of the mold parts, while also allowing easy expulsion of excess lens precursor material from between the mold parts as they are placed together. It is believed that such a combination can reduce the distance across the contact region between the mold parts, which in turn can reduce the distance that excess lens precursor material has to travel as it is squeezed out from between the mold parts, without reducing the integrity of the longitudinal alignment of the parts.

It has been found that minimizing the distance across a contact region, which excess contact lens precursor material has to travel, can reduce the likelihood of flash forming in the contact region, and thus can improve the longitudinal alignment of the parts and reduce defects formed in the edge of the contact lens cast in the mold assembly due to misalignment of the mold parts.

The present disclosure provides, according to a second aspect, a method of making a contact lens comprising the steps of:

providing a first mold part and a second mold part, the first mold part and the second mold part physically engageable to form a contact lens mold assembly;

wherein the first mold part comprises a first lens-forming surface having a central axis and a circumferential edge; a first stop surface extending radially outwardly from the circumferential edge of the first lens-forming surface in a plane perpendicular to the central axis of the first lens-forming surface; a first intermediate region extending from the first stop surface; and a first alignment surface extending from the first intermediate region in a direction parallel to the central axis of the first lens-forming surface;

wherein the second mold part comprises a second lens-forming surface having a central axis and a circumferential edge; a second stop surface extending radially outwardly from the circumferential edge of the second lens-forming surface in a plane perpendicular to the central axis of the second lens-forming surface; a second intermediate region extending from the second stop surface; and a second alignment surface extending from the second intermediate region in a direction parallel to the central axis of the second lens-forming surface; and wherein, in the contact lens mold assembly, the first stop surface, of the first mold part, is in continuous contact with the second stop surface, of the second mold part, around the circumferential edge of the second lens-forming surface, and the first alignment surface, of the first mold part, is in contact with the second alignment surface, of the second mold part;

applying a contact lens precursor material to the first lens-forming surface, of the first mold part, or to the second lens-forming surface, of the second mold part;

placing the first mold part and the second mold part together such that the first alignment surface, of the first mold part, is in contact with the second alignment surface, of the second mold part, and such that the first stop surface, of the first mold part, is in continuous contact with the second stop surface, of the second mold part, around the circumferential edge of the second lens-forming surface of the second mold part;

curing the contact lens precursor material to form an unfinished contact lens;

separating the unfinished contact lens from the first mold part and the second mold part to form a separated contact lens; and placing the separated contact lens in a contact lens package.

As already set out in respect of the first aspect of the invention, the skilled person will understand that specific features of embodiments of the invention described herein that are not incompatible with each other can be present in any combination in example embodiments of the invention.

The method can be any method embodying the invention, wherein the placing step comprises forming an interference fit between the first mold part and the second mold part by a physical engagement of the first alignment surface and the second alignment surface, wherein the interference fit occurs at a location radially outward from the circumferential edge.

The method can be any method embodying the invention, wherein the placing the first mold part and the second mold part together such that the first alignment surface is in contact with the second alignment surface comprises placing the first mold part and the second mold part in correct lateral alignment with each other.

The method can be any method embodying the invention, wherein placing the first mold part and the second mold part together such that the first stop surface is in continuous contact with the second stop surface of the second mold part around the circumferential edge of the second lens-forming surface of the second mold part comprises placing the first mold part and the second mold part in correct longitudinal alignment with each other.

The method can be any method embodying the invention, further comprising a step of washing or extracting the separated contact lens to remove unreacted or uncrosslinked materials from the separated contact lens prior to sealing the contact lens in the contact lens package. The washing or extracting can be performed by contacting the separated contact lens with a washing liquid or extracting liquid, such as a liquid that comprises, consists essential of, or consists of water, organic solvents, such as ethanol, isopropyl alcohol, methanol, or mixtures thereof, and which may optionally include one or more surfactants.

The method can be any method embodying the invention, wherein the separating the unfinished contact lens from the first mold part and the second mold part comprises demolding the contact lens mold assembly so that the unfinished contact lens remains attached to the first or second mold part, and delensing the unfinished contact lens from the mold part to which it remained attached following the demolding, to form the separated contact lens.

The method can be any method embodying the invention, wherein the placing step comprises forming an interference fit between the first mold part and the second mold part by a physical engagement of the first alignment surface and the second alignment surface, and the interference fit occurs at a location radially outward from the circumferential edge.

The method can be any method embodying the invention, further comprising injection molding the first mold member and the second mold member from an injection moldable material, such as a thermoplastic material, as described herein. The injection molding conditions, such as temperature, pressure, and speed, are dependent on the injection moldable material, and can be determined using routine methods as understood by persons of ordinary skill in the art.

The skilled person will understand that the features disclosed in the following paragraphs may similarly be combined in any combination in example embodiments of the invention.

An excess of contact lens precursor material can be applied to the first or second lens-forming surface. Applying an excess of contact lens precursor material can reduce formation of voids between the first lens-forming surface of the first mold part and the second lens-forming surface of the second mold part when the mold parts are placed together.

It has been found that the method of making a contact lens according to the second aspect of the disclosure is a fast and efficient method of making a contact lens. In particular, it has been found that the formation, and assembly and disassembly of the mold parts according to the first aspect of the disclosure can proceed more quickly and more reliably than the formation, and assembly and disassembly of traditional mold parts. It is believed that the separate alignment surfaces and stop surfaces of the mold parts can impose a greater control on the lateral and longitudinal alignment of the parts as they are placed together, than is achieved with more traditional mold parts. Thus, it is believed that the greater and more reliable control on the alignment of the parts achieved by the separate alignment and stop surfaces of the mold parts of the present disclosure can allow the parts to be placed together more rapidly than traditional mold parts. Furthermore, it is believed that the separate alignment and stop surfaces of the mold parts according to the present disclosure can make the parts less susceptible to jamming in an incorrect alignment, when compared to traditional mold parts. Thus, the use of mold parts according to the first aspect of the present disclosure can result in a method of contact lens manufacture with increased speed and reliability as compared to a method which is substantially the same except that uses traditional mold parts.

It has been found that, in an example embodiment of the invention, the mold parts fit together sufficiently tightly to withstand placement in a vacuum environment without problems arising.

The placing step of the method can comprise forming an interference fit between the first mold part and the second mold part by a physical engagement of the first alignment surface and the second alignment surface. The interference fit can occur at a location radially outward from the circumferential edge. The placing step of the method can comprise forming a plurality of interference fits between the first mold part and the second mold part.

The method can be a method wherein the placing the first mold part and the second mold part together such that the first alignment surface is in contact with the second alignment surface comprises placing the first mold part and the second mold part in correct lateral alignment with each other.

The method can be a method wherein placing the first mold part and the second mold part together such that the first stop surface is in continuous contact with the second stop surface of the second mold part around the circumferential edge of the second lens-forming surface of the second mold part comprises placing the first mold part and the second mold part in correct longitudinal alignment with each other.

The separating the unfinished contact lens from the first mold part and the second mold part can comprise demolding the contact lens mold assembly so that the unfinished contact lens remains attached to the first or second mold part. The separating the unfinished contact lens from the first mold part and the second mold part can comprise delensing the unfinished contact lens from the mold part to which it remained attached following the demolding, to form the separated contact lens. The demolding can be a dry, mechanical demolding process not involving applying a liquid to the mold assembly. The demolding can be a wet demolding process involving applying a liquid to the mold assembly. The delensing can be a dry, mechanical demolding process not involving application of a liquid to the lens and the mold part. The delensing can be a wet delensing process involving applying a liquid to the lens and the mold part.

The method of the present disclosure can further comprise a step of washing, extracting, hydrating, or any combination thereof, the separated contact lenses. The washing, extracting, hydrating, or any combination thereof, can be conducted after placing the separated contact lens in the contact lens package. Alternatively, the washing, extracting, hydrating, or any combination thereof, can be conducted before placing the separated contact lens in the contact lens package. The step of extracting the separated contact lens can comprise removing unreacted materials from the separated contact lens. The unreacted materials can comprise unreacted monomers. The unreacted materials can comprise a diluent, a compatibilizer, a surfactant, or any other uncrosslinked material, or any combination thereof.

The providing step of the method can comprise injection molding at least one of the first mold member and the second mold member from an injection moldable material. The providing step of the method can comprise injection molding at least one the first mold member and the second mold member from an injection moldable material, and then lathing a portion of the at least one mold member, forming a lathed lens-forming surface on the at least one mold member.

The injection molding of the at least one mold member and the second mold member can comprise injection molding the at least one mold member in a contact lens mold injection cavity. The method can further comprise, during the injection molding, monitoring an injection pressure with a pressure sensor. The method can further comprise, during the injection molding, monitoring a cavity temperature with a temperature sensor. The method can comprise, during the injection molding, monitoring an injection pressure with a pressure sensor, and monitoring a cavity temperature with a temperature sensor.

The injection molding of the at least one mold member and the second mold member can comprise injection molding a plurality of mold members in a plurality of contact lens mold injection cavities. The method can further comprise, during the injection molding, monitoring an injection pressure. The method can further comprise, during the injection molding, monitoring a plurality of cavity temperatures, each with an individual temperature sensor. The method can comprise, during the injection molding, monitoring an injection pressure, and monitoring a plurality of cavity temperatures, each with an individual temperature sensor.

For the purpose of monitoring the mold cavity, a cavity temperature sensor can be provided at or in one or more of the mold cavities, for example, in each mold cavity. The temperature sensor can be machined to provide a surface that is flush with the surface of an inner wall of the respective cavity.

Exemplary cavity pressure sensors and cavity temperature sensors that can be used include those available from the Priamus System Technologies AG of Schaffhausen, Switzerland. For example, suitable cavity pressure sensors that can be used include the PRIASED® and PRIASAFE® sensors, and sensor models 6001A, 6001B, 6002A, 6002B, 6003A, 6003B, 6006BC, 6007BC, 6008A, 6010BC, 6011BC, and 6411A, all available from Priamus System Technologies AG. Exemplary cavity temperature sensors that can be used include the PRISOLARIS™ sensors and sensor models 4003C, 4004C, 4005B, 4006B, 4007B, 4008B, 4009B, 4010B, 4011B, 4012B, 4013A, 4014A, 4015A, 4016A, 4017A, 4018A, and 4050A, all available from Priamus System Technologies AG.

The present disclosure provides, according to a third aspect, an automated system for making a contact lens, wherein the automated system includes a component for forming a contact lens mold assembly according to the first aspect of the disclosure. The automated system can further comprise an injection molding machine, an apparatus for applying the contact lens precursor material, an apparatus for curing the contact lens precursor material, an apparatus for separating the unfinished contact lens, an apparatus for placing the separated contact lens in a contact lens package, or any combination thereof.

The present disclosure provides, according to a fourth aspect, a contact lens mold part comprising:
a lens-forming surface having a central axis and a circumferential edge;
a stop surface extending radially outwardly from the circumferential edge of the lens-forming surface in a plane perpendicular to the central axis of the lens-forming surface;
an intermediate region extending from the stop surface; and
an alignment surface extending from the intermediate region in a direction parallel to the central axis of the lens-forming surface.

The skilled person will of course be appreciated that features described in relation to one aspect of the present disclosure may be incorporated into other aspects of the present disclosure. For example, the method of the disclosure may incorporate any of the features described with reference to the apparatus of the disclosure, and vice versa.

Figure 2:
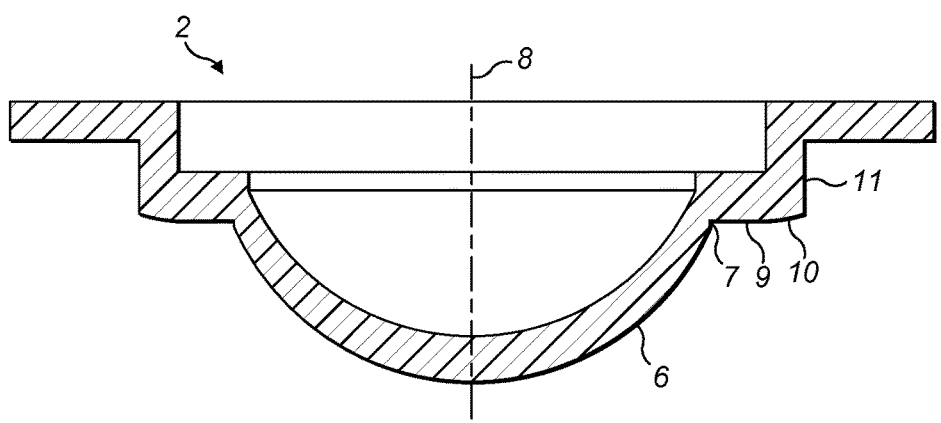
FIG. 2 is a cross-sectional view of the first mold part according to the first embodiment of the disclosure.
Figure 3:
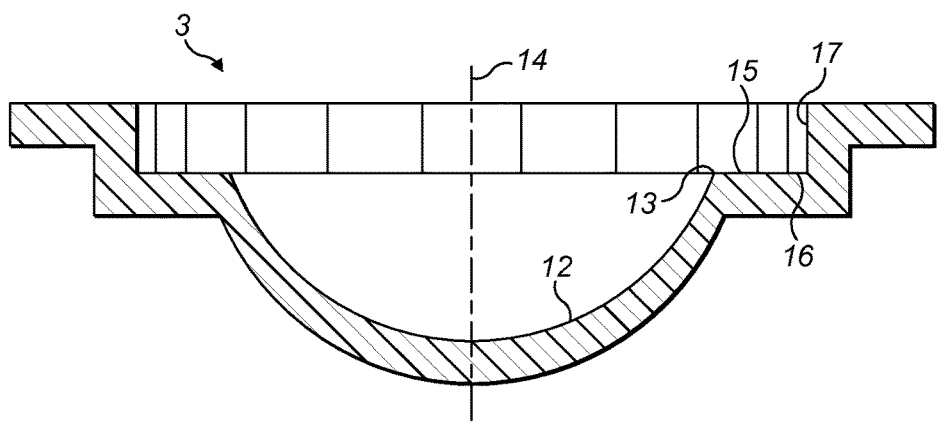
FIG. 3 is a cross-sectional view of the second mold part according to the first embodiment of the disclosure.

With reference to the drawings, in a first exemplary embodiment, a contact lens mold assembly 1 comprises a first mold part 2, a second mold part 3, a lens-shaped cavity 4, and an annular cavity 5 (FIG. 1). In use, contact lens precursor material, such as a polymerizable material or a contact lens formulation, fills lens-shaped cavity 4, and excess contact lens precursor material passes into annular cavity 5. First mold part 2 of contact lens mold assembly 1 includes a convex lens-forming surface 6 having a circumferential edge 7 and a central axis 8 (FIG. 2). First mold part 2 also includes first stop surface 9 extending radially outwardly from circumferential edge 7 in a plane perpendicular to central axis 8, first intermediate region 10 extending from first stop surface 9, and first alignment surface 11 extending from first intermediate region 10 in a direction parallel to central axis 8. Second mold part 3 of contact lens mold assembly 1 comprises a concave lens-forming surface 12 having circumferential edge 13 and a central axis 14 (FIG. 3). Second mold part 3 also comprises second stop surface 15 extending radially outwardly from circumferential edge 13 in a plane perpendicular to central axis 14, second intermediate region 16 extending from second stop surface 15, and second alignment surface 17 extending from second intermediate region 16 in a direction parallel to central axis 14.

According to the first exemplary embodiment, intermediate region 10 of first mold part 2 comprises a surface that curves away from the plane of first stop surface 9, and intermediate region 16 of second mold part 3 comprises a surface that is continuous with and in the same plane as second stop surface 15 (FIGS. 1 to 3).

Figure 4:
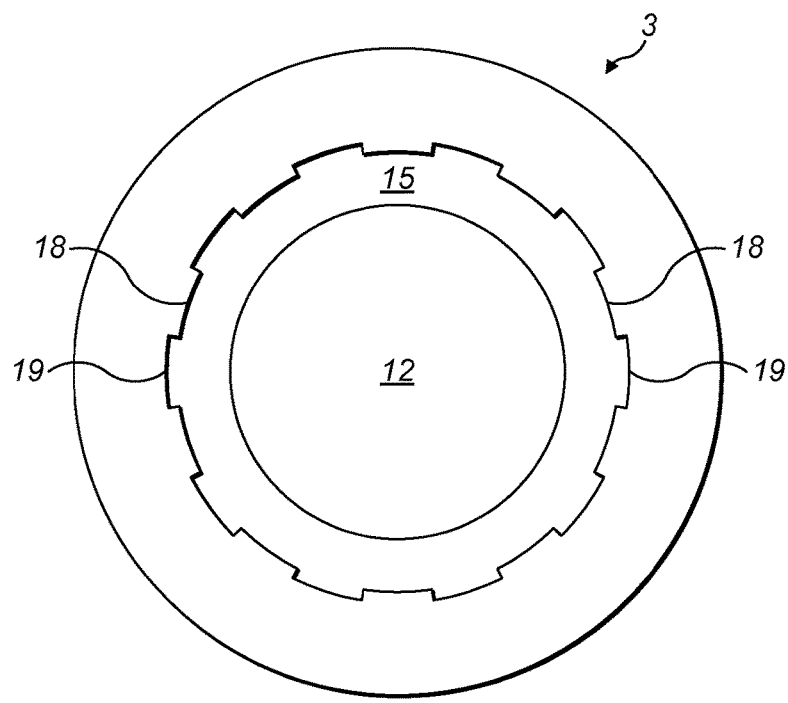
FIG. 4 is a top plan view of the second mold part according to the first embodiment of the disclosure.

Second alignment surface 17 of second mold part 3 according to the first exemplary embodiment comprises raised regions 18 and recessed regions 19 (FIG. 4).

Figure 5:
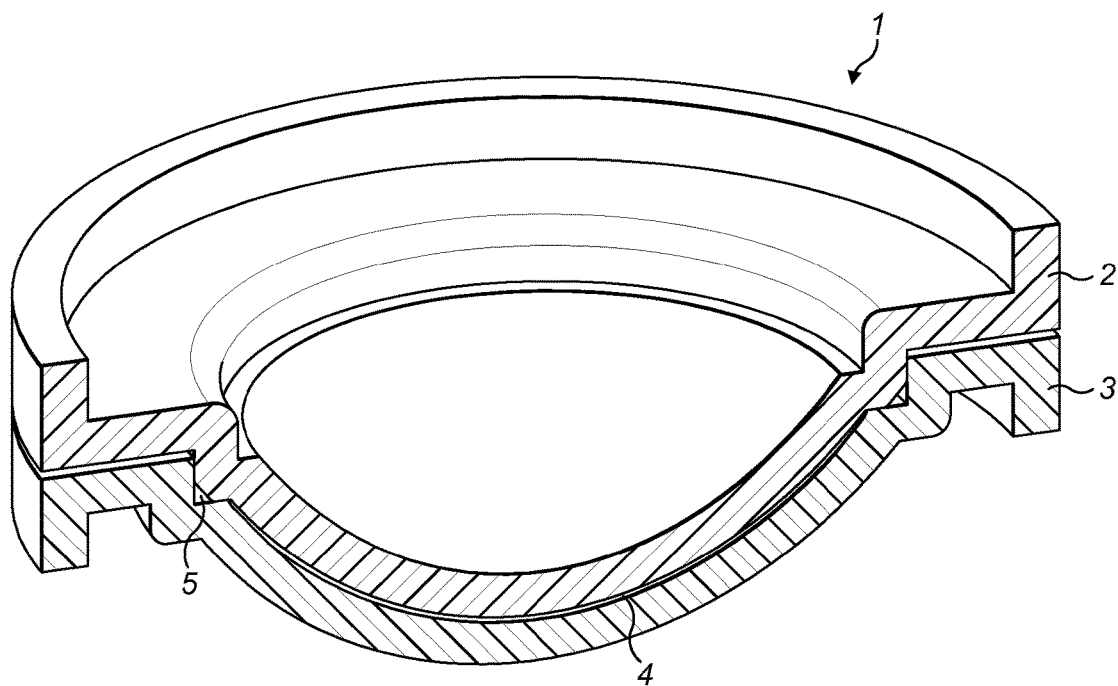
FIG. 5 is a cut-away perspective view of the mold assembly according to the first aspect of the disclosure.
Figure 6:
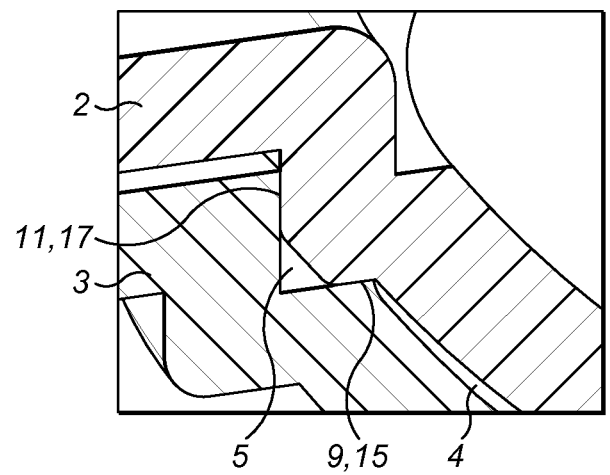
FIG. 6 is a close-up view of a section of the cut-away perspective view of FIG. 5.

When first mold part 2 and second mold part 3 are placed together to form mold assembly 1, according to the first exemplary embodiment, first intermediate region 10 of first mold part 2, and second intermediate region 16 of second mold part 3 cooperate to form annular cavity 5 (FIG. 5). First stop surface 9 and first alignment surface 11 of first mold part 2 are brought into contact with second stop surface 15 and second alignment surface 17 of second mold part 3, respectively (FIG. 6). In other words, when first mold part 2 and second mold part 3 are combined and form contact lens mold assembly 1, first stop surface 9 and second stop surface 15 are in direct contact, and first alignment surface 11 and second alignment surface 17 are in direct contact.

Figure 7:
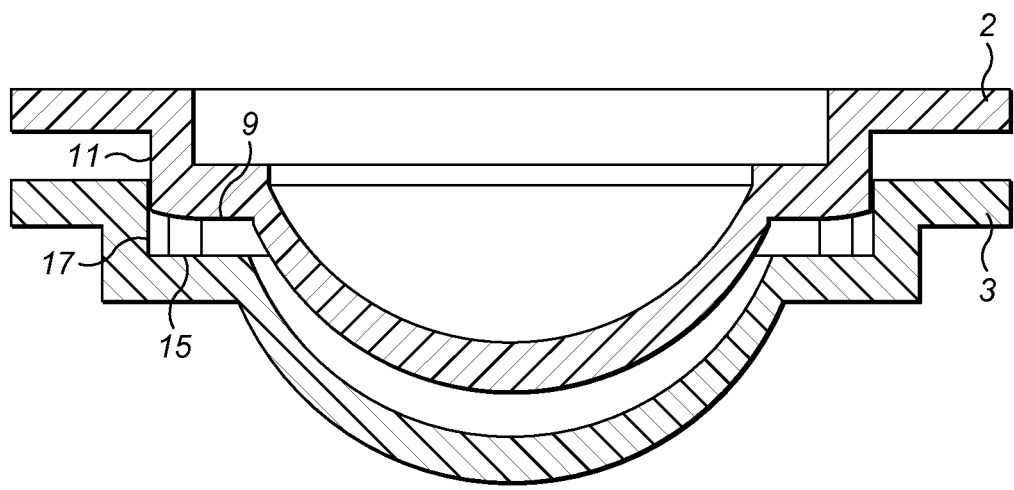
FIG. 7 is a cross-sectional view of the first mold part and the second mold part of the first embodiment of the disclosure, at an intermediate stage during construction of the mold assembly.

As first mold part 2 and second mold part 3 of mold assembly 1 are brought together, first alignment surface 11 of first mold part 2 is brought into contact with second alignment surface 17 of second mold part 3 before first stop surface 9 of first mold part 2 and second stop surface 15 of second mold part 3 are brought into contact (FIG. 7). In order to bring first stop surface 9 of first mold part 2 into contact with second stop surface 15 of second mold part 3, the mold parts are pressed together such that alignment surface 17 of second mold part 3 slides over alignment surface 11 of first mold part 2.

In the first exemplary embodiment, first mold part 2 and second mold part 3 of mold assembly 1 are configured to provide an interference fit between the mold parts such that second mold part 3 grips first mold part 2 at the contact regions between raised regions 18 of second alignment surface 17 and first alignment surface 11 (not shown).

Figure 8:
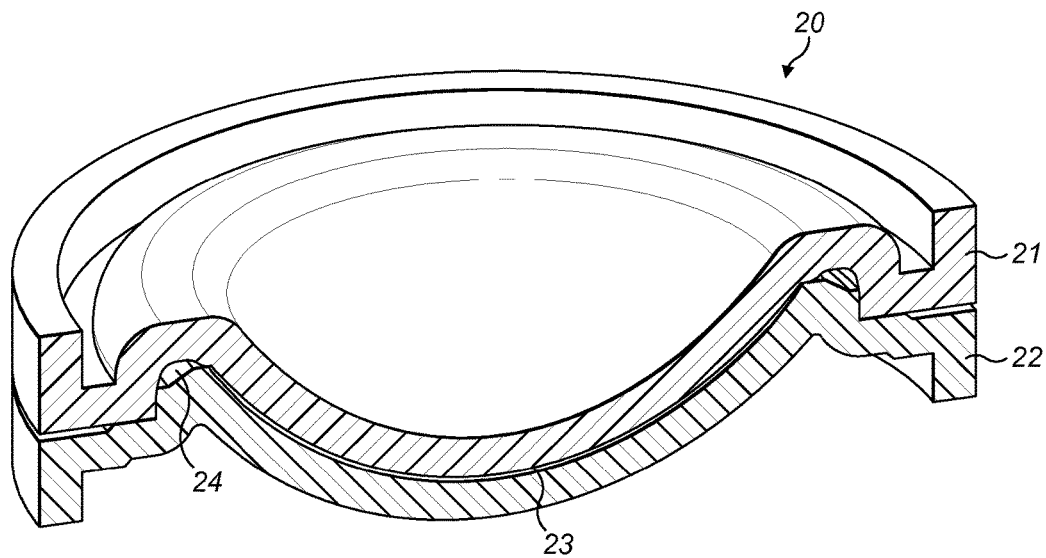
FIG. 8 is a cutaway perspective view of a mold assembly according to a second embodiment of the disclosure.
Figure 9:
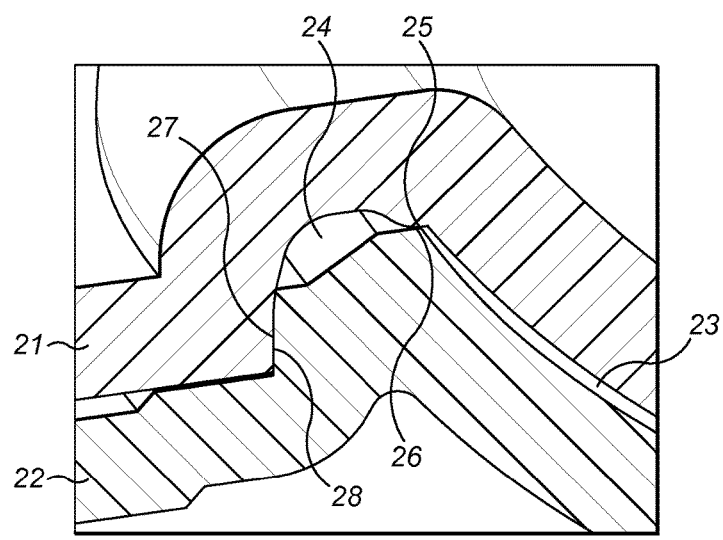
FIG. 9 is a close-up view of a section of the cut-away perspective view of FIG. 8.

In a second exemplary embodiment, a contact lens mold assembly 20 comprises a first mold part 21, a second mold part 22, a lens-shaped cavity 23, and an annular cavity 24 (FIG. 8). In use, contact lens precursor material fills lens-shaped cavity 23, and excess contact lens precursor material passes into annular cavity 24. To form contact lens mold assembly 20, a first stop surface 25, and a first alignment surface 27 of first mold part 21 are contacted with a second stop surface 26 and a second alignment surface 28, respectively, of second mold part 22 (FIG. 9). In other words, when first mold part 21 and second mold part 22 are combined and form contact lens mold assembly 20, first stop surface 25 and second stop surface 26 are in direct contact, and first alignment surface 27 and second alignment surface 28 are in direct contact.

As first mold part 21 and second mold part 22 of mold assembly 20 are brought together, first alignment surface 27 of first mold part 21 is brought into contact with second alignment surface 28 of second mold part 22 before first stop surface 25 of first mold part 21 and second stop surface 26 of second mold part 22 are brought into contact (not shown). In order to bring first stop surface 25 of first mold part 21 into contact with second stop surface 26 of second mold part 22, the mold parts are pressed together such that alignment surface 28 of second mold part 22 slides over alignment surface 27 of first mold part 21.

In the second exemplary embodiment, first mold part 21 and second mold part 22 of contact lens mold assembly 20 are configured to provide an interference fit between the mold parts such that first mold part 21 grips second mold part 22 at the contact region between first alignment surface 27 of first mold part 21 and second alignment surface 28 of second mold part 22.

Figure 10:
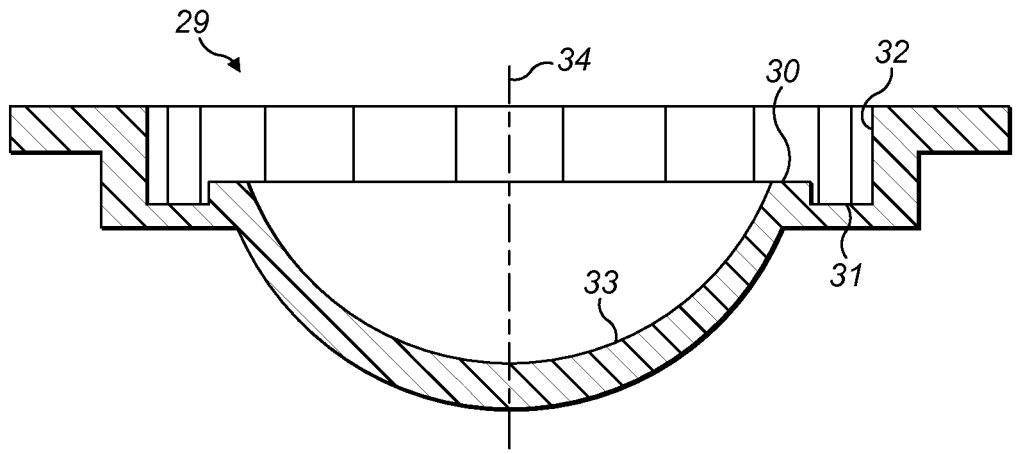
FIG. 10 is a cross-sectional view of a second mold part according to a third embodiment of the disclosure.
Figure 11:
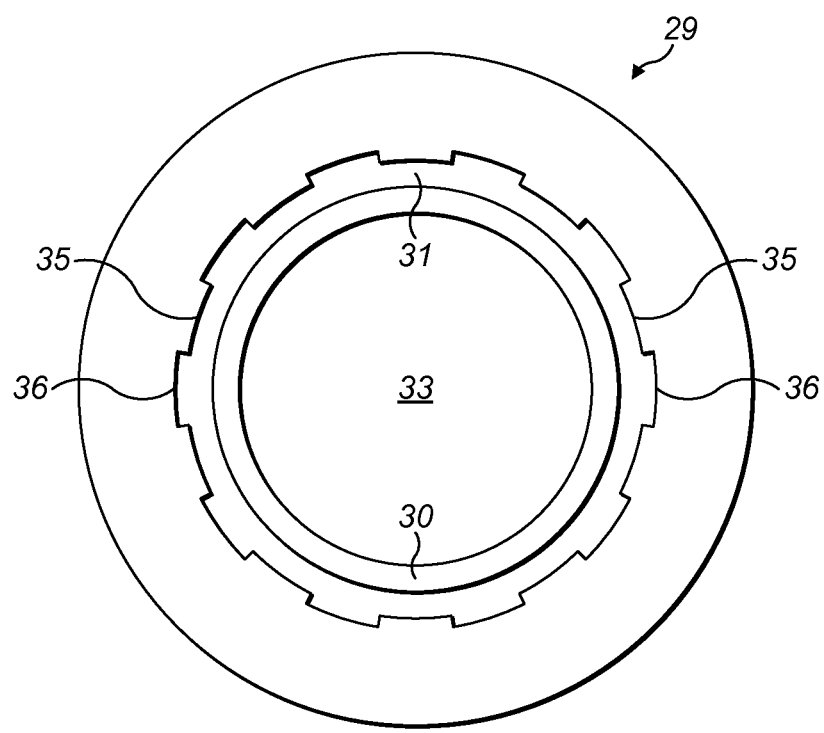
FIG. 11 is a top plan view of the second mold part according to the third embodiment of the disclosure.

In a third exemplary embodiment, a second mold part 29 comprises a second stop surface 30, a second intermediate region having an annular recessed section with a planar surface 31, a second alignment surface 32, and a concave lens-forming surface 33 having a central axis 34 (FIG. 10). Planar surface 31 of the annular recessed section of the second intermediate region of second mold part 29 is parallel to second stop surface 30. Second alignment surface 32 comprises raised regions 35 and recessed regions 36 (FIG. 11). Planar surface 31 of the recessed section of the second intermediate region of second mold part 29 forms the base of an annular trough, which annular trough is disposed between second stop surface 30 and second alignment surface 32 (FIGS. 10 and 11). The annular trough receives excess monomer, and thereby acts to receive and retain flash.

Figure 12:
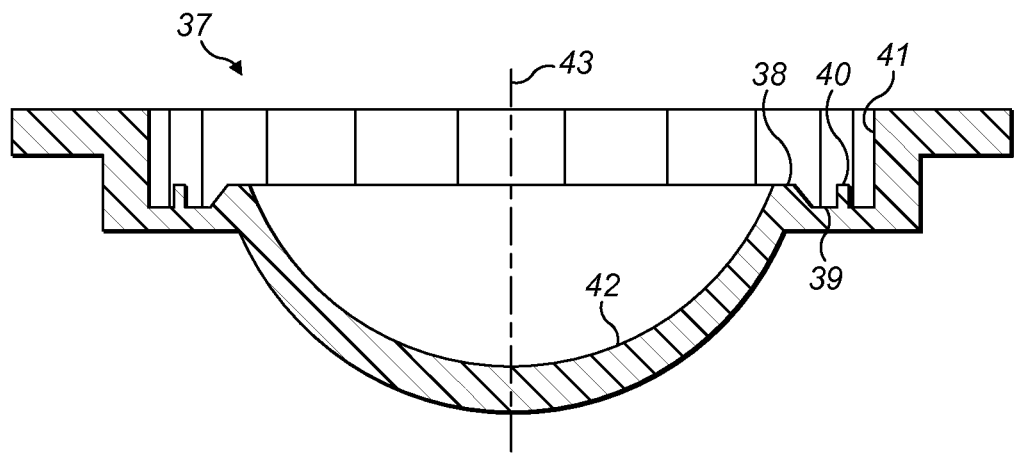
FIG. 12 is a cross-sectional view of a second mold part according to a fourth embodiment of the disclosure.
Figure 13:
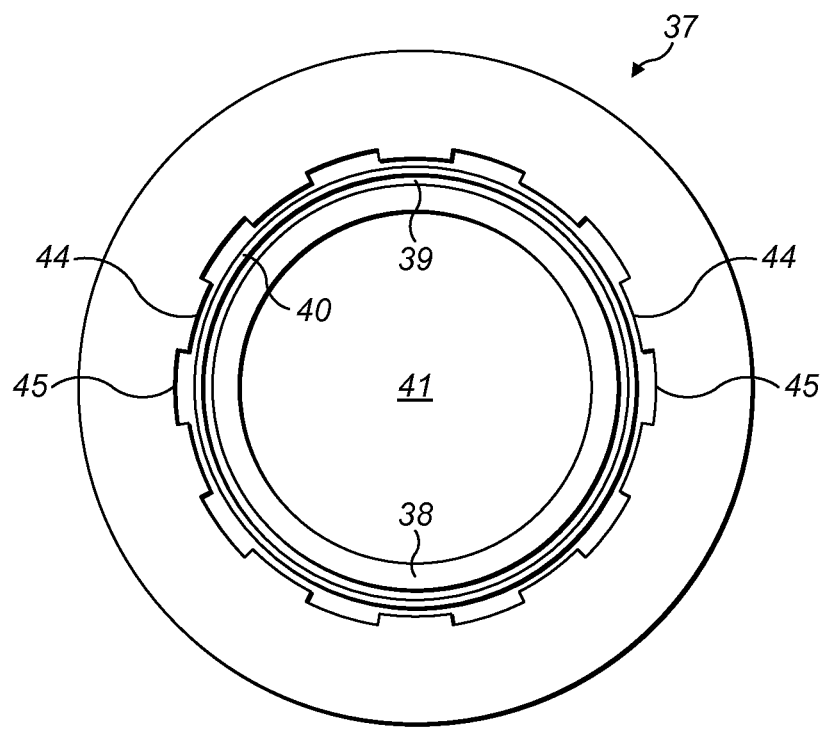
FIG. 13 is a top plan view of the second mold part according to the fourth embodiment of the disclosure.
Figure 14:
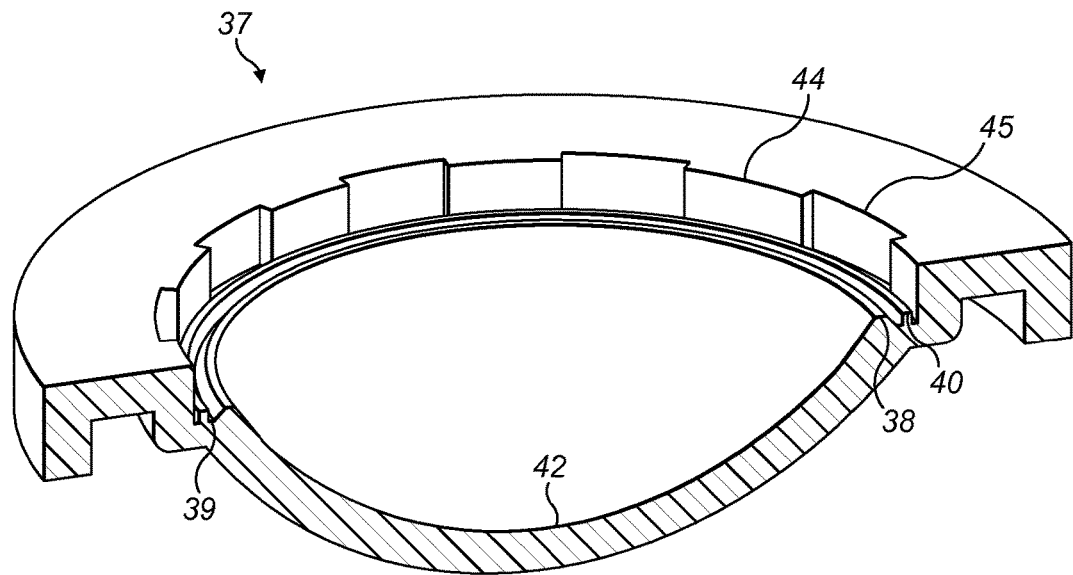
FIG. 14 is a cut-away perspective view of the second mold part according to the fourth embodiment of the disclosure.

In a fourth exemplary embodiment, a second mold part 37 comprises a second stop surface 38, a second intermediate region having an annular recessed section 39, a second alignment surface 41, and a concave lens-forming surface 42 having a central axis 43 (FIGS. 12 to 14). Recessed section 39 of the second intermediate region of second mold part 37 comprises a ridge having a surface 40 extending in the plane of second stop surface 38. Second alignment surface 41 of second mold part 37 comprises raised regions 44 and recessed regions 45 (FIGS. 13 and 14). The ridge of recessed section 39 of the second intermediate region of second mold part 37 is in the form of an annular ridge (FIGS. 12 to 14). The ridge improves the retention of flash within annular recessed section 39.

Figure 15:
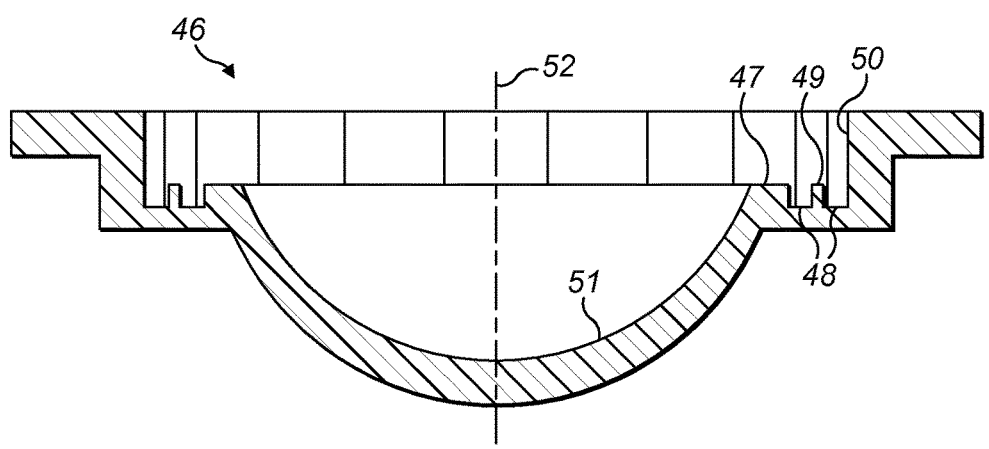
FIG. 15 is a cross-sectional view of a second mold part according to a fifth embodiment of the disclosure.
Figure 16:
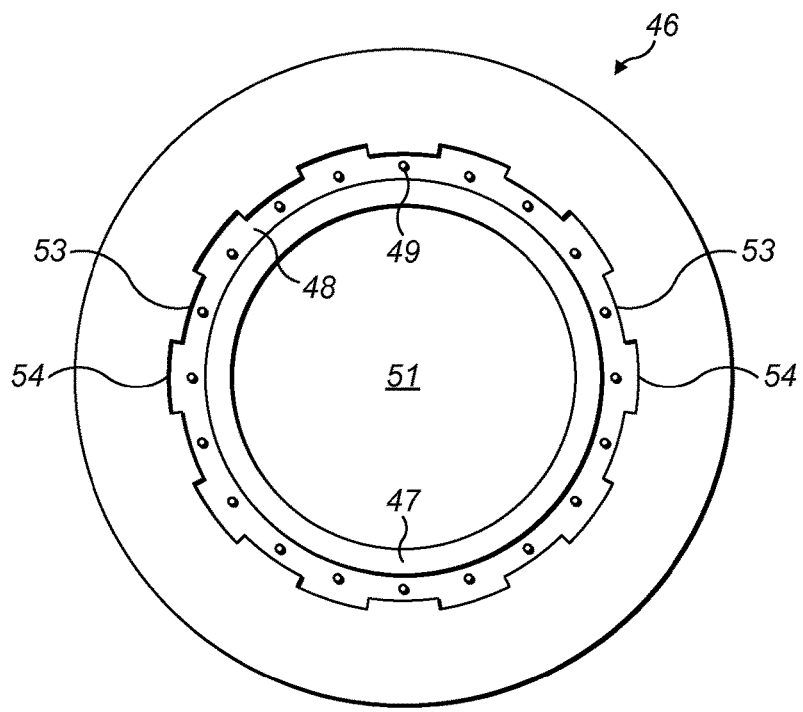
FIG. 16 is a top plan view of the second mold part according to the fifth embodiment of the disclosure.
Figure 17:
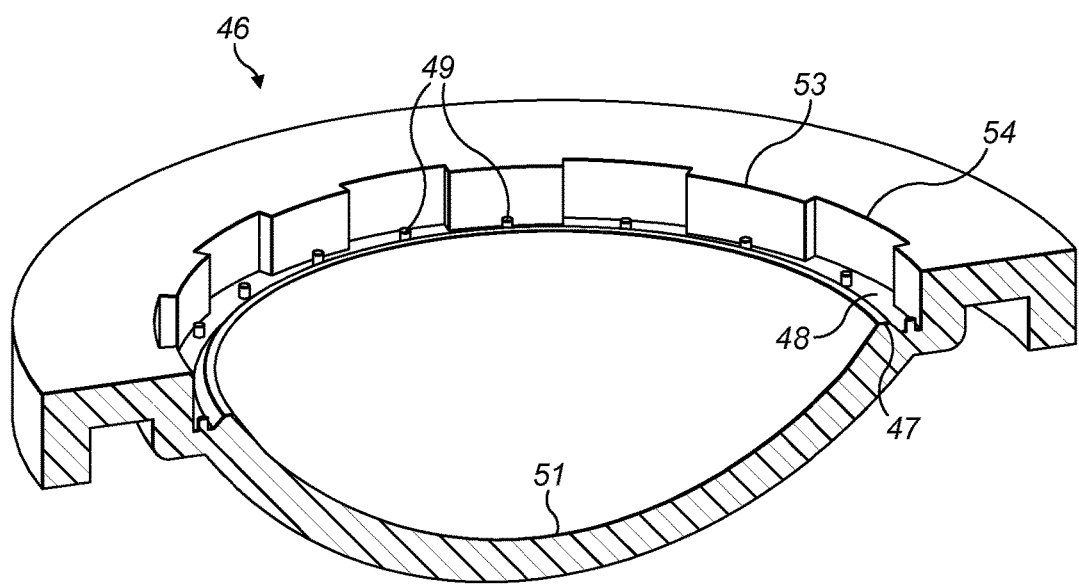
FIG. 17 is a cut-away perspective view of the second mold part according to the fifth embodiment of the disclosure.

In a fifth exemplary embodiment, a second mold part 46 comprises a second stop surface 47, a second intermediate region having a recessed section 48, a second alignment surface 50, and a concave lens-forming surface 51 having a central axis 52 (FIGS. 15 to 17). Recessed section 48 of the second intermediate region of second mold part 46 comprises a plurality of projections having surfaces 49 extending in the plane of second stop surface 47. Second alignment surface 50 of second mold part 46 comprises raised regions 53 and recessed regions 54 (FIGS. 16 and 17). The plurality of projections (having surfaces 49 extending in the plane of second stop surface 47) of the second intermediate region of second mold part 46 are evenly distributed in a direction parallel to the circumferential edge of lens-forming surface 51. The projections improve the retention of flash within the recessed region.

Further features of embodiments of the invention are set out in the following numbered clauses:

1. A contact lens mold assembly comprising a first mold part and a second mold part, wherein the first mold part comprises:
   a first lens-forming surface having a central axis and a circumferential edge;
   a first stop surface extending radially outwardly from the circumferential edge of the first lens-forming surface in a plane perpendicular to the central axis of the first lens-forming surface;
   a first intermediate region extending from the first stop surface; and
   a first alignment surface extending from the first intermediate region in a direction parallel to the central axis of the first lens-forming surface;
   wherein the second mold part comprises:
   a second lens-forming surface having a central axis and a circumferential edge;
   a second stop surface extending radially outwardly from the circumferential edge of the second lens-forming surface in a plane perpendicular to the central axis of the second lens-forming surface;
   a second intermediate region extending from the second stop surface; and
   a second alignment surface extending from the second intermediate region in a direction parallel to the central axis of the second lens-forming surface;
   wherein, in the contact lens mold assembly formed from the first mold part and the second mold part, the first stop surface, of the first mold part, is in continuous contact with the second stop surface, of the second mold part, around the circumferential edge of the second lens-forming surface, and wherein the first alignment surface, of the first mold part, is in contact with the second alignment surface, of the second mold part.

2. The contact lens mold assembly according to clause 1, wherein the first stop surface of the first mold part extends outwardly relative to the central axis of the first lens-forming surface by about 0.2 mm from the circumferential edge of the first lens-forming surface, and wherein the second stop surface of the second mold part extends outwardly relative to the central axis of the second lens-forming surface by about 0.2 mm from the circumferential edge of the second lens-forming surface 3. The contact lens mold assembly according to clause 1 or clause 2, wherein the first alignment surface of the first mold part extends about 0.8 mm from the first intermediate region in a direction parallel to the central axis of the first lens-forming surface, and wherein the second alignment surface of the second mold part extends about 0.8 mm from the second intermediate region in a direction parallel to the central axis of the second lens-forming surface.

4. The contact lens mold assembly according to any preceding clause, wherein the first mold part and the second mold part are configured to fit together with an interference fit provided by a physical engagement of the first alignment surface and the second alignment surface such that one mold part grips the other mold part.

5. The contact lens mold assembly according to any preceding clause, wherein the contact between the first alignment surface of the first mold part and the second alignment surface of the second mold part is discontinuous in a direction parallel to the circumferential edge of the second lens-forming surface of the second mold part.

6. The contact lens mold assembly according to clause 5, wherein the second alignment surface of the second mold part comprises one or more raised regions and one or more recessed regions.

7. The contact lens mold assembly according to any preceding clause, wherein at least one of the first intermediate region of the first mold part and the second intermediate region of the second mold part is configured to provide an annular cavity between the first mold part and the second mold part.

8. The contact lens mold assembly according to clause 7, wherein the first intermediate region of the first mold part comprises a curved surface extending from the first stop surface towards the first alignment surface.

9. The contact lens mold assembly according to clause 7, wherein the second intermediate region of the second mold part comprises an annular recessed section extending parallel to the circumferential edge of the second lens-forming surface.

10. The contact lens mold assembly according to clause 9, wherein the annular recessed section of the second intermediate region of the second mold part comprises an annular ridge extending parallel to the circumferential edge of the second lens-forming surface, and wherein the annular ridge comprises a planar surface extending in the plane of the second stop surface.

11. The contact lens mold assembly according to clause 9, wherein the annular recessed section of the second intermediate region of the second mold part comprises a plurality of projections distributed evenly in a direction parallel to the circumferential edge of the second lens-forming surface, and wherein each projection comprises a planar surface extending in the plane of the second stop surface.

12. A method of making a contact lens comprising the steps of:
   providing a first mold part and a second mold part, the first mold part and the second mold part physically engageable to form a contact lens mold assembly,
   wherein the first mold part comprises a first lens-forming surface having a central axis and a circumferential edge; a first stop surface extending radially outwardly from the circumferential edge of the first lens-forming surface in a plane perpendicular to the central axis of the first lens-forming surface; a first intermediate region extending from the first stop surface; and a first alignment surface extending from the first intermediate region in a direction parallel to the central axis of the first lens-forming surface;
   wherein the second mold part comprises a second lens-forming surface having a central axis and a circumferential edge; a second stop surface extending radially outwardly from the circumferential edge of the second lens-forming surface in a plane perpendicular to the central axis of the second lens-forming surface; a second intermediate region extending from the second stop surface; and a second alignment surface extending from the second intermediate region in a direction parallel to the central axis of the second lens-forming surface; and
   wherein, in the contact lens mold assembly, the first stop surface, of the first mold part, is in continuous contact with the second stop surface, of the second mold part, around the circumferential edge of the second lens-forming surface, and the first alignment surface, of the first mold part, is in contact with the second alignment surface, of the second mold part;

applying a contact lens precursor material to the first lens-forming surface of the first mold part or the second lens-forming surface of the second mold part;

placing the first mold part and the second mold part together such that the first alignment surface of the first mold part is in contact with the second alignment surface of the second mold part, and such that the first stop surface of the first mold part is in continuous contact with the second stop surface of the second mold part around the circumferential edge of the second lens-forming surface of the second mold part;

curing the contact lens precursor material to form an unfinished contact lens;

separating the unfinished contact lens from the first mold part and the second mold part to form a separated contact lens; and placing the separated contact lens in a contact lens package.

13. The method of clause 12, wherein the placing step comprises forming an interference fit between the first mold part and the second mold part by a physical engagement of the first alignment surface and the second alignment surface, wherein the interference fit occurs at a location radially outward from the circumferential edge.

14. The method of clause 12 or clause 13, wherein the placing the first mold part and the second mold part together such that the first alignment surface is in contact with the second alignment surface comprises placing the first mold part and the second mold part in correct lateral alignment with each other.

15. The method of any of clauses 12 to 14, wherein placing the first mold part and the second mold part together such that the first stop surface is in continuous contact with the second stop surface of the second mold part around the circumferential edge of the second lens-forming surface of the second mold part comprises placing the first mold part and the second mold part in correct longitudinal alignment with each other.

16. The method of any of clauses 12 to 15, further comprising a step of extracting the separated contact lens to remove unreacted materials from the separated contact lens prior to sealing the contact lens in the contact lens package.

17. The method of any of clauses 12 to 16, wherein the separating the unfinished contact lens from the first mold part and the second mold part comprises demolding the contact lens mold assembly so that the unfinished contact lens remains attached to the first or second mold part, and delensing the unfinished contact lens from the mold part to which it remained attached following the demolding, to form the separated contact lens.

18. The method of any of clauses 12 to 17, wherein the placing step comprises forming an interference fit between the first mold part and the second mold part by a physical engagement of the first alignment surface and the second alignment surface, and the interference fit occurs at a location radially outward from the circumferential edge.

19. The method of any of clauses 12 to 18, further comprising injection molding the first mold member and the second mold member from an injection mouldable material.

20. A contact lens mold part comprising:
a lens-forming surface having a central axis and a circumferential edge;
a stop surface extending radially outwardly from the circumferential edge of the lens-forming surface in a plane perpendicular to the central axis of the lens-forming surface;
an intermediate region extending from the stop surface; and
an alignment surface extending from the intermediate region in a direction parallel to the central axis of the lens-forming surface.

While the present disclosure has been described and illustrated with reference to particular embodiments, it will be appreciated by those of ordinary skill in the art that the disclosure lends itself to many different variations not specifically illustrated herein.

In the foregoing description, where integers or elements are mentioned which have known, obvious, or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as preferable, advantageous, convenient, or the like are optional and do not limit the scope of the independent claims. Moreover, it is to be understood that such optional integers or features, while of possible benefit in some embodiments of the disclosure, may not be desirable, and may therefore be absent, in other embodiments.

All patents and publications cited herein are incorporated herein by reference in their entireties.

The invention claimed is:

1. A contact lens mold assembly comprising a first mold part and a second mold part, wherein the first mold part comprises:
a first lens-forming surface having a central axis and a circumferential edge;
a first stop surface extending radially outwardly from the circumferential edge of the first lens-forming surface in a plane perpendicular to the central axis of the first lens-forming surface;
a first intermediate region extending from the first stop surface; and
a first alignment surface extending from the first intermediate region in a direction parallel to the central axis of the first lens-forming surface;
wherein the second mold part comprises:
a second lens-forming surface having a central axis and a circumferential edge;
a planar second stop surface extending radially outwardly from the circumferential edge of the second lens-forming surface in a plane perpendicular to the central axis of the second lens-forming surface;
a second intermediate region extending from the planar second stop surface;
a second alignment surface extending from the second intermediate region in a direction parallel to the central axis of the second lens-forming surface; and
an annular recessed section extending radially outwardly of and intersecting with the planar second stop surface, the annular recessed section comprising an annular ridge therein having a planar surface that lies in the plane of the planar second stop surface;
wherein, in the contact lens mold assembly formed from the first mold part and the second mold part, the first stop surface, of the first mold part, is in continuous contact with the planar second stop surface, of the second mold part, around the entire circumferential edge of the second lens-forming surface, and wherein the first alignment surface, of the first mold part, is in contact with the second alignment surface, of the second mold part.

2. The contact lens mold assembly according to claim 1, wherein the first stop surface of the first mold part extends outwardly relative to the central axis of the first lens-forming surface by about 0.2 mm from the circumferential edge of the first lens-forming surface, and wherein the planar second stop surface of the second mold part extends outwardly relative to the central axis of the second lens-forming surface by about 0.2 mm from the circumferential edge of the second lens-forming surface.

3. The contact lens mold assembly according claim 1, wherein the first alignment surface of the first mold part extends about 0.8 mm from the first intermediate region in a direction parallel to the central axis of the first lens-forming surface, and wherein the second alignment surface of the second mold part extends about 0.8 mm from the second intermediate region in a direction parallel to the central axis of the second lens-forming surface.

4. The contact lens mold assembly according to claim 1, wherein the first mold part and the second mold part are configured to fit together with an interference fit provided by a physical engagement of the first alignment surface and the second alignment surface such that one mold part grips the other mold part.

5. The contact lens mold assembly according to claim 1, wherein the contact between the first alignment surface of the first mold part and the second alignment surface of the second mold part is discontinuous in a direction parallel to the circumferential edge of the second lens-forming surface of the second mold part.

6. The contact lens mold assembly according to claim 5, wherein the second alignment surface of the second mold part comprises one or more raised regions and one or more recessed regions.

7. The contact lens mold assembly according to claim 1, wherein at least one of the first intermediate region of the first mold part and the second intermediate region of the second mold part is configured to provide an annular cavity between the first mold part and the second mold part.

8. The contact lens mold assembly according to claim 7, wherein the first intermediate region of the first mold part comprises a curved surface extending from the first stop surface towards the first alignment surface.

9. The contact lens mold assembly according to claim 7, wherein the second intermediate region of the second mold part comprises the annular recessed section and the annular recessed section extends parallel to the circumferential edge of the second lens-forming surface.

10. The contact lens mold assembly according to claim 9, wherein the annular ridge extends parallel to the circumferential edge of the second lens-forming surface.

11. The contact lens mold assembly according to claim 1, wherein the first intermediate region is spaced from the second intermediate region such that an annular cavity is formed between the first intermediate region and the second intermediate region.

12. The contact lens mold assembly of claim 1, wherein the second intermediate region of the second mold part comprises a planar surface that is continuous with and in the same plane as the planar second stop surface.

13. A method of making a contact lens comprising the steps of:

providing a first mold part and a second mold part, the first mold part and the second mold part physically engageable to form a contact lens mold assembly, wherein the first mold part comprises a first lens-forming surface having a central axis and a circumferential edge; a first stop surface extending radially outwardly from the circumferential edge of the first lens-forming surface in a plane perpendicular to the central axis of the first lens-forming surface; a first intermediate region extending from the first stop surface; and a first alignment surface extending from the first intermediate region in a direction parallel to the central axis of the first lens-forming surface;

wherein the second mold part comprises a second lens-forming surface having a central axis and a circumferential edge; a planar second stop surface extending radially outwardly from the circumferential edge of the second lens-forming surface in a plane perpendicular to the central axis of the second lens-forming surface; a second intermediate region extending from the planar second stop surface; a second alignment surface extending from the second intermediate region in a direction parallel to the central axis of the second lens-forming surface; and an annular recessed section extending radially outwardly of and intersecting with the planar second stop surface, the annular recessed section comprising an annular ridge therein having a planar surface that lies in the plane of the planar second stop surface;

wherein, in the contact lens mold assembly, the first stop surface, of the first mold part, is in continuous contact with the planar second stop surface, of the second mold part, around the entire circumferential edge of the second lens-forming surface, and the first alignment surface, of the first mold part, is in contact with the second alignment surface, of the second mold part;

applying a contact lens precursor material to the first lens-forming surface of the first mold part or the second lens-forming surface of the second mold part;

placing the first mold part and the second mold part together such that the first alignment surface of the first mold part is in contact with the second alignment surface of the second mold part, and such that the first stop surface of the first mold part is in continuous contact with the planar second stop surface of the second mold part around the circumferential edge of the second lens-forming surface of the second mold part;

curing the contact lens precursor material to form an unfinished contact lens;

separating the unfinished contact lens from the first mold part and the second mold part to form a separated contact lens; and placing the separated contact lens in a contact lens package.

14. The method of claim 13, wherein the placing step comprises forming an interference fit between the first mold part and the second mold part by a physical engagement of the first alignment surface and the second alignment surface, wherein the interference fit occurs at a location radially outward from the circumferential edge.

15. The method of claim 13, wherein the placing the first mold part and the second mold part together such that the first alignment surface is in contact with the second alignment surface comprises placing the first mold part and the second mold part in correct lateral alignment with each other.

16. The method of claim 13, wherein placing the first mold part and the second mold part together such that the first stop surface is in continuous contact with the planar second stop surface of the second mold part around the circumferential edge of the second lens-forming surface of the second mold part comprises placing the first mold part and the second mold part in correct longitudinal alignment with each other.

17. The method of claim 13, further comprising a step of extracting the separated contact lens to remove unreacted materials from the separated contact lens prior to sealing the contact lens in the contact lens package.

18. The method of claim 13, wherein the separating the unfinished contact lens from the first mold part and the second mold part comprises demolding the contact lens mold assembly so that the unfinished contact lens remains attached to the first or second mold part, and delensing the unfinished contact lens from the mold part to which it remained attached following the demolding, to form the separated contact lens.

19. The method of claim 13, wherein the placing step comprises forming an interference fit between the first mold part and the second mold part by a physical engagement of the first alignment surface and the second alignment surface, and the interference fit occurs at a location radially outward from the circumferential edge.

20. The method of claim 13, further comprising injection molding the first mold member and the second mold member from an injection moldable material.

21. The method of claim 13, wherein the second intermediate region of the second mold part comprises a planar surface that is continuous with and in the same plane as the planar second stop surface.

22. A contact lens mold part comprising:
a lens-forming surface having a central axis and a circumferential edge;
a planar stop surface extending radially outwardly from the circumferential edge of the lens-forming surface in a plane perpendicular to the central axis of the lens-forming surface;
an intermediate region extending from the planar stop surface;
an annular recessed section extending radially outwardly of and intersecting with the planar stop surface, the annular recessed section comprising an annular ridge therein having a planar surface that lies in the plane of the planar stop surface; and
an alignment surface extending from the intermediate region in a direction parallel to the central axis of the lens-forming surface.

23. The contact lens mold part of claim 22, wherein the intermediate region comprises a planar surface that is continuous with and in the same plane as the planar stop surface.

* * * * *